United States Patent [19]

Vekselman

[11] Patent Number: 5,318,085
[45] Date of Patent: Jun. 7, 1994

[54] RADIAL TIRE HAVING REDUCED TREADWEAR

[75] Inventor: Ilya W. Vekselman, Akron, Ohio

[73] Assignee: General Tire, Akron, Ohio

[21] Appl. No.: 972,861

[22] Filed: Nov. 6, 1992

Related U.S. Application Data

[63] Continuation of Ser. No. 601,896, Oct. 22, 1990, abandoned.

[51] Int. Cl.[5] .............................................. B60C 11/11
[52] U.S. Cl. .............................................. 152/209 R
[58] Field of Search ........................ 152/209 R, 209 A; D12/141–148

[56] References Cited

U.S. PATENT DOCUMENTS

| D. 55,216 | 5/1920 | Tenney, Jr. | D12/147 |
|---|---|---|---|
| D. 57,377 | 3/1921 | Paull | D12/147 |
| D. 62,164 | 4/1923 | Dickinson | D12/147 |
| D. 89,393 | 3/1933 | Gilbert | D12/147 |
| D. 170,710 | 10/1953 | Nellen | D12/146 |
| D. 283,500 | 4/1986 | Graas et al. | D12/147 |
| 2,154,290 | 4/1939 | Snyder | 152/209 R |
| 4,217,942 | 8/1980 | Takigawa et al. | 152/209 R |
| 4,747,436 | 5/1988 | Williams | 152/209 R |
| 4,815,511 | 3/1989 | Brayer et al. | 152/454 |
| 4,819,704 | 4/1989 | Misawa et al. | 152/209 R |
| 4,877,072 | 10/1989 | Fontaine | 152/209 A |
| 5,178,699 | 1/1993 | Kakumu et al. | 152/209 R |

FOREIGN PATENT DOCUMENTS

| 0268436 | 5/1988 | European Pat. Off. | 152/209 R |
|---|---|---|---|
| 3442300 | 5/1986 | Fed. Rep. of Germany | 152/209 D |
| 0275007 | 12/1986 | Japan | 152/209 R |
| 0061605 | 3/1988 | Japan | 152/209 A |
| 0484176 | 9/1935 | United Kingdom | 152/209 R |
| 2210002 | 6/1989 | United Kingdom | 152/209 D |

OTHER PUBLICATIONS

"Pneumatic Tyre Design" by E. C. Woods 1952, pp. 11–12; 23–24, 30, 32–34.
High Performance Wheel and Tire Handbook (1988) p. 35.
Modern Tire Dealer, vol. 71, No. 1 (Jan. 1990) Advertisement for Goodyear Tires.
Modern Tire Dealer, vol. 71, No. 1 (Jan. 1990) Advertisement for Yks Tires.
Modern Tire Dealer, vol. 71, No. 3 (Mar. 1990) BF Goodrich Advantage Tire.
Modern Tire Dealer, vol. 71, No. 3 (Apr. 1990) Remington Pioneer Tire.
Modern Tire Dealer, vol. 71, No. 3 (Apr. 1990) Yokahama A509 Tire.

Primary Examiner—Michael W. Ball
Assistant Examiner—Nancy Krawzyk
Attorney, Agent, or Firm—Calfee, Halter & Griswold

[57] ABSTRACT

A tread design for a radial tire provides a tread block pattern that reduces the treadwear of the tire. The tread design comprises a plurality of blocks cooperatively formed by circumferential grooves extending around the tire and angularly oriented transverse grooves intersecting the circumferential grooves. The blocks are preferably arranged in three circumferentially extending ribs, wherein each rib is separated from another by a circumferential groove. Each individual block is separated from an adjacent block by a straight transverse groove. Each transverse groove extends at an angle of about 40° to 60° with respect to the circumferential plane of the tire, with the preferred angle being approximately 45°. The tread pattern on the left side tire is the mirror image of the tread pattern on the right side tire.

5 Claims, 3 Drawing Sheets

RADIAL TIRE HAVING REDUCED TREADWEAR

This is a continuation of copending application Ser. No. 07/601,896 filed on Oct. 22, 1990, now abandoned.

TECHNICAL FIELD

The present invention relates to a tread design for a radial tire that reduces treadwear. Specifically, the tread design includes a plurality of blocks formed between circumferential and transverse grooves, wherein each transverse groove extends at an angle of about 40° to 60° with respect to the circumferential plane of the tire.

BACKGROUND

A radial tire for a passenger vehicle typically includes a tire carcass, breaker belt and tire tread. The tire carcass includes radial plies extending from bead to bead and embedded in rubber. The radial plies typically include at least two layers, wherein each layer has a series of reinforcing cords which extend substantially perpendicular to the circumferential direction of the tire.

The belt plies are positioned between the carcass or body plies and the tread. The belt plies similarly include at least two layers, wherein the first layer has a series of reinforcing cords extending at an angle of about 15° to 30° with respect to the circumferential plane of the tire, and the second layer has a series of reinforcing cords extending at an angle of about 105° to 120° with respect to the circumferential direction of the tire, and crossing the first layer. A radial tire is superior in performance—and in particular, comfort, vehicle control, acceleration and braking—to conventional bias tires by virtue of the radial carcass plies and reinforced belt plies.

Another factor which determines tire performance is treadwear. The faster the tire tread wears out during use, the quicker the performance characteristics of the tire are reduced, and the more frequently the tire needs to be replaced. The pattern on the tire tread in large part determines the treadwear of the tire. The tread pattern is segmented into a plurality of raised blocks defined and separated by intersecting circumferential and transverse grooves. The grooves are necessary to provide flexibility and water removal, while the blocks determine the control, acceleration and braking characteristics of the tire. Consequently, the slower the tire tread wears out, the longer the performance characteristics of the tire are maintained and the less frequently the tire needs to be replaced.

The types of irregular tire treadwear include (1) heel-toe wear, (2) cupping, and (3) diagonal wear. Heel-toe wear is the wearing down of the rear portion of a tread block to a greater degree than the front portion of the block. Cupping is the wearing down of several circumferentially adjacent tread blocks in a dish-like manner. Diagonal wear is the excessive wear of a row of tread blocks extending from one shoulder of the tire to the other shoulder at an acute angle to the mid-circumferential plane of the tire. The best measure of the total wear of a tire tread is the weight loss, or the difference between the weight of the tire when it was new and the weight of the tire after it has been in service.

In general, the factors that effect the treadwear of the tire include: (1) the block dimension, (2) the number of ribs, (3) the transverse groove angle, and (4) the shoulder groove subdepth. The dimension of a tread block includes the length of each block in the circumferential direction of the tire. The number of ribs is the number of columns of blocks that extend circumferentially around the length of the tire, with each column being separated by a circumferential groove. Further, the transverse groove angle is the angle at which the transverse grooves, which separate adjacent blocks, extend across the width of the tire. Finally, the shoulder groove subdepth is the depth of a defined portion of the transverse grooves between the blocks.

The block dimension, number of ribs and transverse groove angle determine the amount of tread that contacts the road, and hence the traction and control of the car. The shoulder groove subdepth determines the ability of the grooves to channel water. Moreover, the block dimension, number of ribs, transverse groove angle and shoulder groove subdepth all cooperate in determining the overall performance of the tire—and in particular, in determining the treadwear of the tire.

Prior art tires have attempted to reduce treadwear with various tread designs. For example, a tire manufactured by Yokahama, Model AVS Intermediate, shows a tread pattern wherein at least six ribs of blocks are formed in the tire tread in an asymetrical shape. The transverse grooves on the Yokahama tread pattern extend at an angle of about 45° with respect to the circumferential direction of the tire.

SUMMARY OF THE INVENTION

The present invention provides a new and useful tread design for a passenger vehicle radial tire that reduces treadwear.

According to one aspect of the invention, the tire tread includes a plurality of blocks arranged in three ribs extending circumferentially around the tire. A circumferential groove is disposed between each rib. The tread also includes transverse grooves extending between each adjacent block in each rib. Each transverse groove extends at an angle of about 40° to 60° with respect to the circumferential direction of the tire. The angularly oriented transverse grooves may be circumferentially staggered from one another from rib to rib. The transverse grooves on the shoulder rib have raised portions extending outwardly a selected distance from the circumferential groove.

It has been found that a tire tread design having the aforementioned properties has a decrease in tire treadwear. In particular, the cupping, heel-toe wear and diagonal wear of the tire are reduced. Consequently, a tire having the aforementioned properties has an increase in performance and is replaced less frequently.

Further features and advantages of the present invention will become apparent from the following detailed description and the accompanying drawings.

DETAILED DESCRIPTION OF THE PREFERRED EMBODIMENTS

Figure 1:
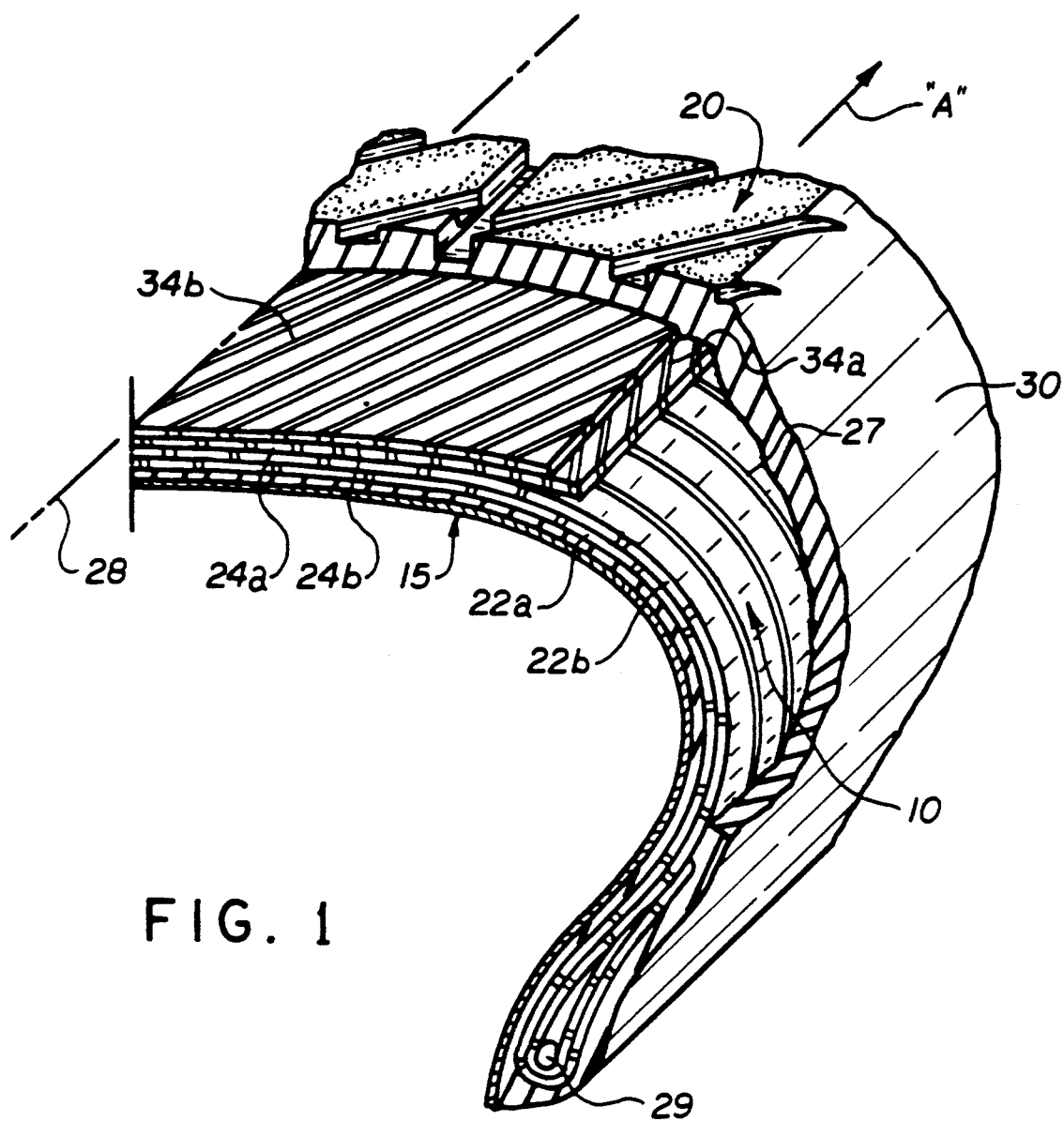
FIG. 1 is a partially cut away half-sectional perspective view of one form of the radial tire constructed according to the present invention.

As described above, the present invention relates to a tread design for a radial tire which reduces treadwear. As shown in FIG. 1, the radial tire includes a tire carcass, indicated generally at 10, an inner liner for the tire carcass, indicated generally at 15, and a tire tread, indicated generally at 20. The tire carcass includes radial plies and belt plies encased in and bonded to rubber.

The radial plies of the tire include at least two layers 22a, 22b, wherein each layer has reinforcing cords, indicated generally at 27, embedded therein which extend substantially perpendicular to the circumferential plane 28 of the tire. The radial plies extend from one bead 29, through one sidewall 30, under the tread and across the circumferential plane 28 of the tire. The plies continue, through the other sidewall to the other bead of the tire. The radial plies add flexibility and strength to the tire, particularly in the area of the sidewalls. The tire bead 29, comprising a plurality of steel bands reinforces the lower end portions of the sidewalls and mates with the flange on the tire rim (not shown) to provide support for the tire and to seal air in the tire.

The radial plies are overlaid by the belt plies. The belt plies of the tire typically include at least two belt layers 32a, 32b, wherein each belt layer also has reinforcing cords 34a, 34b embedded therein. The cords 34a of the first belt layer extend at an angle of about 15° to about 30° relative to the circumferential plane of the tire, while the cords 34b of the second belt layer extend at an angle of about 105° to about 120° relative to the circumferential plane of the tire. The cords of the second belt layer thus cross the cords of the first belt layer.

Figure 2:
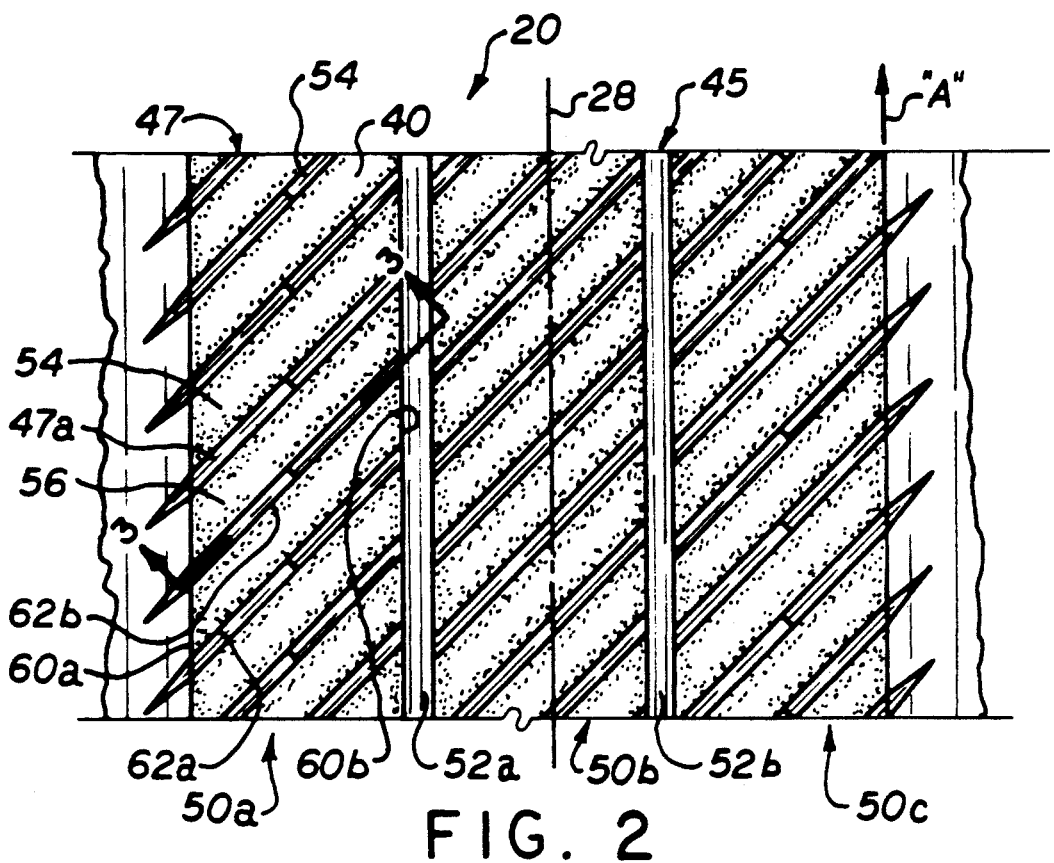
FIG. 2 is a partial plan view illustrating a preferred block pattern of a tire tread for a left tire made in accordance with the present invention.

As shown in FIG. 2, the tread 20 of the radial tire includes a plurality of raised blocks formed between circumferential grooves, indicated generally at 45, and transverse grooves, indicated generally at 47. The tread protects the carcass and belt layers while providing traction for the tire on the road surface.

In the preferred form of the invention, the blocks of the tire tread are arranged in three ribs or columns, indicated generally at 50a, 50b, 50c, which extend circumferentially around the tire. Each column of blocks is separated from the other by a circumferential groove. For example, the first column 50a and second column 50b are separated by a first circumferential groove 52a, and the second column 50b and the third column 50c are separated by a second circumferential groove 52b. In the preferred embodiment, each column of blocks has an axial width of about 1.5 inches, and the circumferential grooves between them have a depth of about 0.35 inches.

Figure 3:
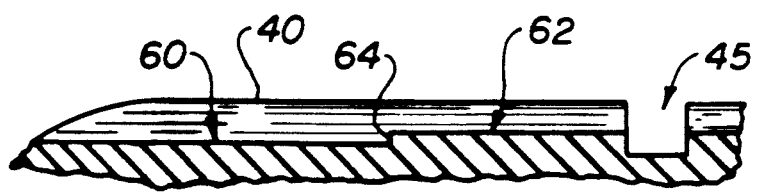
FIG. 3 is a cross sectional view of the preferred block pattern of the tread area, taken along the plane 3—3 of FIG. 2.

Each block is individually separated from an adjacent block in the same rib or column by a transverse groove. For example, block 54 is separated from block 56 by transverse groove 47A. As illustrated most clearly in FIG. 3, the first column of blocks 50a has transverse grooves in which an outer portion, indicated generally at 60, has more depth and is disposed toward the sidewall of the tire, and which an inner portion, indicated generally at 62, has less depth and is disposed more toward the middle of the tire tread. Both the outer and inner portions of the transverse grooves most closely adjacent the tire's shoulder are conventionally referred to as the "shoulder groove", while the inner portion of the groove is specifically referred to as the "subdepth" of the shoulder groove.

The outer portion of each shoulder groove has a depth of about 9 millimeters (0.35 inches), while the shoulder groove subdepth has a depth of about 30% of the depth of the outer portion, or about 3 millimeters (0.12 inches). The subdepth of the shoulder groove reduces irregular wear of the tire and typically extends outwardly about halfway along the groove until a downwardly-stepped portion 64 interconnects the higher shoulder groove subdepth with the lower outer portion of the shoulder groove.

The third column of blocks 50c (FIG. 2), includes transverse grooves having inner and outer stepped depths of the same dimensions as the transverse grooves in the first column 50a. In particular, the shoulder groove subdepth for the transverse grooves in the third column extend outwardly about halfway along the groove until a downwardly-stepped portion, similar to that shown in FIG. 3 at 64, interconnects the higher shoulder groove subdepth with the lower outer portion of the shoulder groove. Accordingly, the dimensions of the shoulder grooves in the third column will not be discussed further.

Finally, the second column of blocks 50b, which is centrally located between the first column 50a and third column 50c on the tire tread, also have angular transverse grooves which are disposed along the center of the tire tread, and which separate adjacent blocks in that rib. The grooves in the second column, however, do not have a stepped depth and consequently, have a substantially constant depth of about 9 millimeters (0.35 inches).

In the preferred form of the invention, as shown in FIG. 2, the transverse grooves in the first, second and third columns extend at an angle of about 40° to 60°, and preferably at an angle of 45°, with respect to the circumferential plane 28 of the tire. As viewed in FIG. 2, the transverse grooves on the tread pattern for the left tire extend from the left outside shoulder of the tire and are slanted upwardly toward the right inside shoulder of the tire, in the direction "A" in which the tire rotates when the vehicle is moving forward. The transverse grooves in the second column of blocks 50b can be offset or circumferentially staggered from the transverse grooves in the first column 50a and third column 50c as shown in FIG. 2. Staggering the center transverse grooves from the shoulder transverse grooves reduces the noise of the tire tread on the road.

Also in the preferred form of the invention, the blocks have a substantially parallelogram shape. Each block has two ends 60a, 60b and two sides 62a, 62b. The length of each block in the circumferential direction of the tire is measured by the length of each end. Additionally, the sides of each block define the transverse angular width of the block. The sides of the blocks preferably extend at an angle of about 40° to 60° with respect to the circumferential plane of the tire.

In the preferred embodiment of the invention, the surface of the blocks cover approximately 66% of the total tire tread surface area, while the tire grooves cover approximately 33% of the surface area. A tire having the aforementioned properties has a reduction in treadwear and in particular, a reduction in tread weight loss, heel-toe wear and diagonal wear—as compared to conventional tires.

Tests were conducted on tire treads having a variety of block lengths, ribs, transverse groove angles and shoulder groove subdepths. It was found that the block length, number of ribs, transverse groove angle and shoulder groove subdepth affected the weight loss of the tire tread. It was further found that the block length and shoulder groove subdepth affected the heel-toe wear of the tire tread. Finally, it was found that the block length, number of ribs and transverse groove angle affected the diagonal wear of the tire tread.

From the conclusions reached in the tests, it was determined that a tire tread having a block length of 12.8 millimeters (0.5 inches), three ribs, a transverse groove angle of 45° and a shoulder groove subdepth of less than 30% of the depth of the outer portions of the shoulder grooves resulted in a tire having the optimum performance characteristics. In particular, it was found that the tire tread constructed in accordance with the present invention had a reduced tread weight loss. Further, it was found that the tire tread had a desired rate for heel-toe wear, cupping and diagonal wear, as compared to other tire tread patterns.

Figure 4:
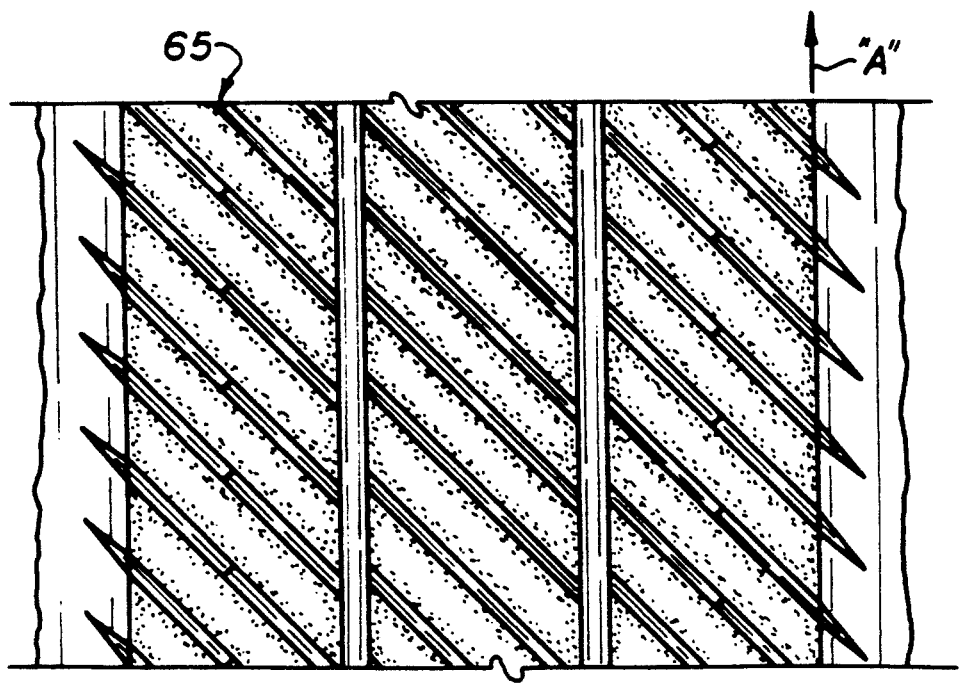
FIG. 4 is a partial plan view illustrating the block pattern of a tire tread for a right tire used in conjunction with the left tire tread of FIG. 2;
}

The above-described tire was designed asymmetrically, whereby the transverse grooves for tires on the left side of the vehicle, as illustrated in FIG. 2, extend at an angle of about 40° to 60° with respect to the circumferential plane of the tire in one direction, while the transverse grooves for tires on the right side of the vehicle, as illustrated generally at 65 in FIG. 4, extend at an angle of about 40° to 60° with respect to the circumferential plane of the tire in the other direction.

Different tires are designed for the left side of the vehicle and the right side of the vehicle, i.e., the tires are asymmetrical. The tire tread dimensions of the tire can be expressed using the Cartesian coordinate system whereby the x-axis is the axial direction of the tire (i.e., along the axis of rotation of the tire) and the y-axis is the circumferential direction of the tire (i.e., in the direction of the circumferential plant). When mounted on a vehicle, the tire designed for the left side of the vehicle (FIG. 2) has transverse grooves which extend in the first and third quadrants of the Cartesian axes from the outside edge to the inside edge of the tire; while the tire designed for the right side of the vehicle (FIG. 4) has transverse grooves which extend in the second and fourth quadrants of the Cartesian axes from the outside edge to the inside edge of the tire. The tread pattern for the right side tire is therefore the mirror image of the tread pattern for the left side tire. All other design characteristics for the right side remain the same as the design characteristics for the left side tires. It has been found that asymmetrical tires having the above-mentioned characteristics result in tires having reduced treadwear and consequently, the best overall performance.

Figure 5:
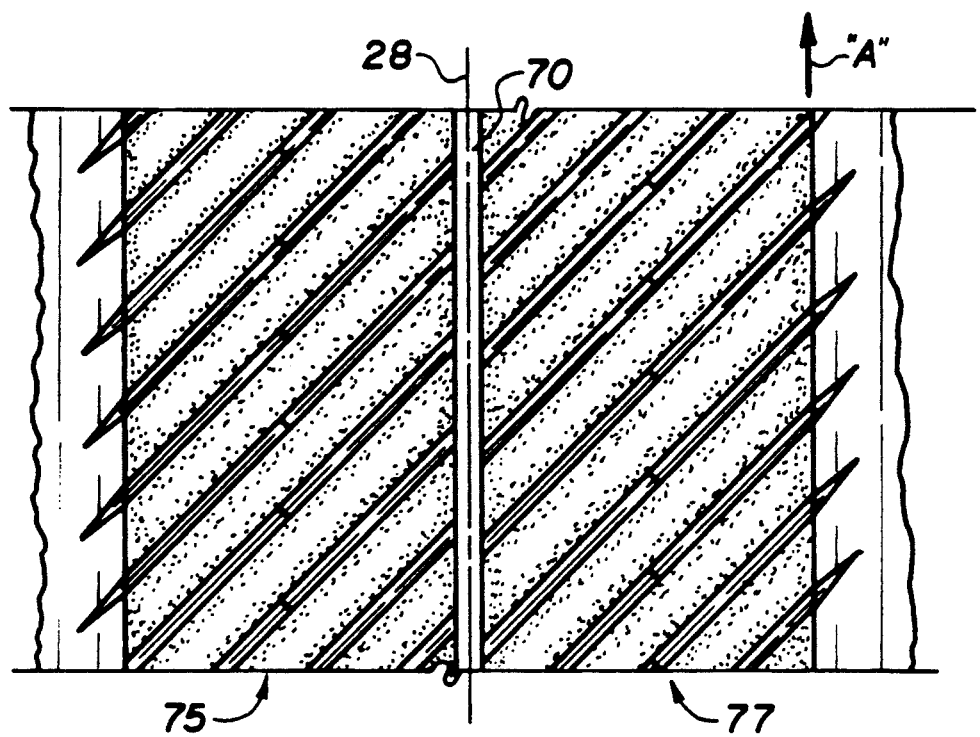
FIG. 5 is a partial plan view illustrating a second embodiment of a block pattern of a tire tread.

In a second embodiment of the invention, as illustrated in FIG. 5, the tire has one circumferential groove separating two ribs. Specifically, groove 70 separates a first rib, indicated generally at 75, and a second rib, indicated generally at 77. In the second embodiment, the width of each block is about 39 millimeters (1.5 inches). All other design parameters remain the same as in the first embodiment, such as a transverse groove angle of about 40° to 60°, a subdepth of less than 30% of the depth of the outer portions of the shoulder groove, and a lower outer portion of the shoulder groove of about 9 millimeters (0.35 inches).

Figure 6:
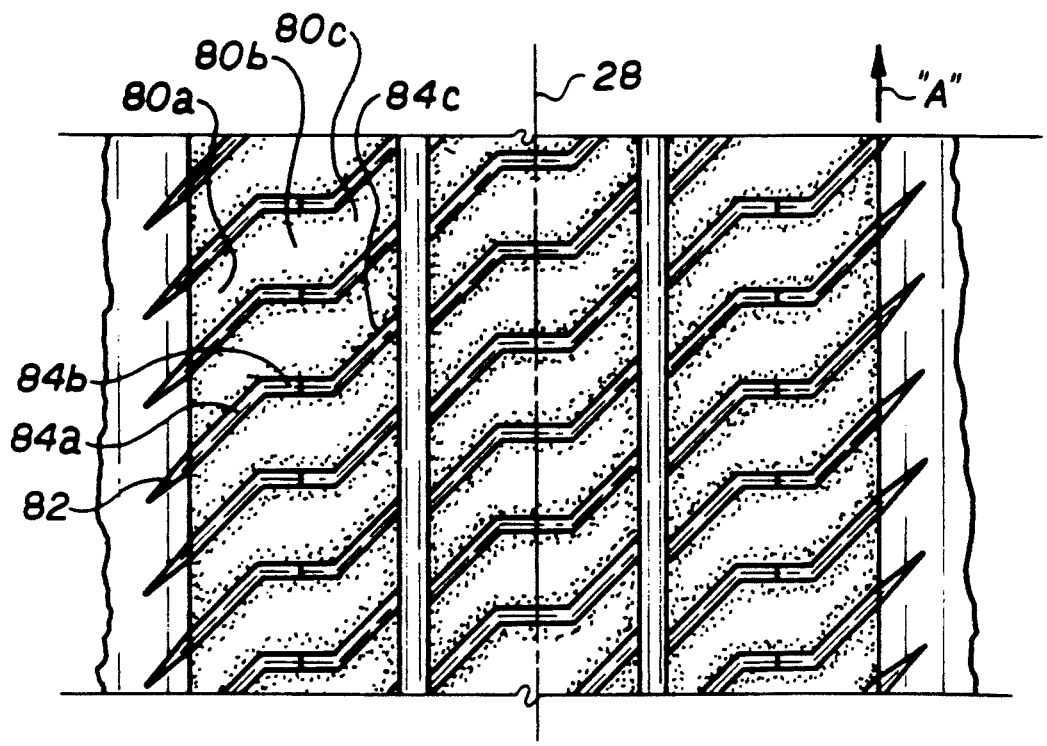
FIG. 6 is a partial plan view illustrating a third embodiment of the block pattern of the tread area of a tire.

In the third embodiment of the invention, as illustrated in FIG. 6, the blocks for the right and left side tires may be substantially "zig-zagged" in shape. Each block, for example, may have a first section 80a formed at an angle of about 45°, a second section 80b formed at an angle of about 90°, and a third section 80c formed at an angle of about 45° with respect to the circumferential plane of the tire.

Each transverse groove has the same zig-zag angles as the three sections of each block. For example, transverse groove 82 has a first section 84a which extends at an angle of about 45°, a second section 84b that extends at an angle of about 90° and a third section 84c which extends at an angle of about 45° with respect to the circumferential direction or plane of the tire. In this third embodiment, the lengths of the second sections of the blocks and grooves should be relatively short, so that the major direction of the transverse grooves is at an acute angle to the circumferential plane of the tire, rather than being perpendicular to that plane. In the third embodiment, all other design parameters remain the same as in the first embodiment.

The above-described embodiments of the tire tread result in increased performance for the tire. Specifically, the tire has reduced treadwear, particularly in tread weight loss, heel-toe wear and diagonal wear. The reduced treadwear in turn increases the performance of the tire and reduces the frequency of replacement.

The principals, preferred embodiment and modes of operation of the present invention have been described in the foregoing specification. The invention which is intended to be protected herein should not, however, be construed as limited to the particular form described as it is to be regarded illustrative rather than restrictive. Variations and changes may be made by those skilled in the art without departing from the spirit of the invention. Accordingly, the foregoing detailed description should be considered exemplary in nature and not as limiting to the scope and spirit of the invention set forth in the appended claims.

What is claimed is:

1. A radial tire, comprising:
   a tread portion having a plurality of parallelogram-shaped blocks formed by circumferential grooves extending around the outer surface of the tire and transverse grooves extending between the circumferential grooves, said blocks having a length in the circumferential direction of the tire of about 0.5 inches;
   said circumferential grooves separating said blocks into only two or three ribs across the width of the tread, wherein a circumferential groove separates each rib;
   said transverse grooves separating adjacent blocks in each rib, wherein said transverse grooves adjacent the shoulders of the tire have axially inside portions and axially outside portions, the axially inside portions of the transverse grooves having a depth which is less than 30% of the depth of the axially outside portions of the transverse grooves, and
   said transverse grooves extending at an angle of about 45° with respect to the circumferential direction of the tire between each tread block, and, using Cartesian axes wherein the x-axis is the axial direction of the tire and the y-axis is the circumferential direction of the tire, for a tire designed to be mounted on the left side of the vehicle, said transverse grooves extend in the first and third quadrants of the Cartesian axes, and for a tire designed to be mounted on the right side of the vehicle, said transverse grooves extend in the second and fourth quadrants of the Cartesian axes, such that the tread portion of the tire has a reduced rate of wear.

2. A radial tire as in claim 1, wherein said circumferential and transverse grooves of said tread portion have a depth of about 0.35 inches.

3. A radial tire comprising:

a tread portion having plurality of blocks formed by circumferential grooves extending around the outer surface of the tire and transverse grooves extending between the circumferential grooves, said blocks having a length in the circumferential direction of the tire of about 0.5 inches;

said circumferential grooves separating said blocks into only two ribs across the width of the tread, wherein a circumferential groove separates each rib; and said transverse grooves separating adjacent blocks in each rib and having a first portion extending in a first direction at approximately a 45 degree angle, a second portion extending in the first direction at approximately a 45 degree angle, and a third portion interconnecting the first and second portions extending at approximately a 90 degree angle with respect to the circumferential direction of the tire, said transverse grooves adjacent the shoulders of the tire having axially inside portions and axially outside portion, the axially inside portions of the transverse grooves having a depth which is less than 30% of the depth of the axially outside portions of the transverse grooves such that the tread portion of the tire has a reduced rate of wear.

4. A radial tire having a tread portion comprising:

a plurality of blocks formed by circumferential grooves extending around the outer surface of the tire and transverse grooves extending between the circumferential grooves, said blocks having a length in the circumferential direction of the tire of about 0.5 inches;

said circumferential grooves separating said blocks into only three ribs across the width of the tread, wherein a circumferential groove separates each rib; and said transverse grooves separating adjacent blocks in each rib and having a first portion extending in a first direction at approximately a 45 degree angle, a second portion extending in the first direction at approximately a 45 degree angle, and a third portion interconnecting the first and second portions extending at approximately a 90 degree angle with respect to the circumferential direction of the tire, said transverse grooves adjacent the shoulders of the tire having axially inside portions and axially outside portions, the axially inside portions of the transverse grooves having a depth which is less than 30% of the depth of the axially outside portions of the transverse grooves such that the tread portion of the tire has a reduced rate of wear.

5. A radial tire as in claim 4, wherein said circumferential and transverse grooves have a depth of about 0.35 inches.

* * * * *